US012750774B2

(12) United States Patent
Haran et al.

(10) Patent No.: US 12,750,774 B2
(45) Date of Patent: Sep. 29, 2026

(54) METHODS AND DEVICES FOR LOWERING POWER REQUIREMENTS IN BATTERY-OPERATED MOBILE ELECTRONIC DEVICES USED IN V2X COMMUNICATIONS

(71) Applicant: QUALCOMM Incorporated, San Diego, CA (US)

(72) Inventors: Onn Haran, Kfar Netter (IL); Shay Koren, Kfar Netter (IL)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 18/593,878

(22) Filed: Mar. 2, 2024

(65) Prior Publication Data

US 2024/0349182 A1 Oct. 17, 2024

Related U.S. Application Data

(60) Provisional application No. 63/507,114, filed on Jun. 9, 2023, provisional application No. 63/496,466, filed on Apr. 17, 2023.

(51) Int. Cl.
*H04W 52/02* (2009.01)
*H04W 4/40* (2018.01)

(52) U.S. Cl.
CPC ......... *H04W 52/0209* (2013.01); *H04W 4/40* (2018.02)

(58) Field of Classification Search
CPC ............... H04W 52/0209; H04W 4/40; H04W 52/0225
See application file for complete search history.

(56) References Cited

U.S. PATENT DOCUMENTS 12,079,058 B2 * 9/2024 Haran .................... H04W 4/44

* cited by examiner

*Primary Examiner* — Diane D Mizrahi
(74) *Attorney, Agent, or Firm* — Holland & Hart LLP/QUALCOMM Incorporated

(57) ABSTRACT

Devices and method of use for reducing power requirements in battery-operated vehicle-to-everything (V2X) communications. Such devices include a receiver and a transmitter. When installed in a warning vehicle, the receiver may be configured to receive a message from a vulnerable road user (VRU) at risk, and the transmitter may be configured to transmit, after receiving the message from the VRU at risk, only during a short interframe space (SIFS) period in dedicated short-range communications (DSRC), or only during a predetermined period in cellular V2X (C-V2X) communications. When included in a mobile electronic device of a VRU, the receiver may be configured to detect only a message received from a warning vehicle during a SIFS period after transmission by the VRU device in DSRC, or only a message received from the warning vehicle in a defined time period after transmission by the VRU device in C-V2X communications, the receiver being further configured to be turned off until a next transmission by the VRU device.

20 Claims, 6 Drawing Sheets

METHODS AND DEVICES FOR LOWERING POWER REQUIREMENTS IN BATTERY-OPERATED MOBILE ELECTRONIC DEVICES USED IN V2X COMMUNICATIONS

This application is related to and claims priority from U.S. Provisional Patent Applications No. 63/496,466 filed Apr. 17, 2023 and 63/507,114 filed Jun. 9, 2023, both of which are incorporated herein by reference in their entirety.

FIELD

Embodiments disclosed herein relate generally to V2X transmission scheduling methods ("schemes") and devices used to reduce the activity of a battery-operated devices with V2X capabilities (for example smartphones), also referred to, and in particular, to methods in which vulnerable road users (VRUs) carrying low-power V2X devices are warned by vehicles ("warning vehicles") that put them at risk.

Definitions

"V2X device": device with vehicle-to-everything (V2X) communications capability.

"Low-power V2X device": battery-operated device that requires less power consumption for V2X operation than known regular battery-operated V2X devices.

"VRU": vulnerable road user, i.e. any road user not occupying a vehicle.

"VRU device": low-power V2X device carried by (or associated with) a VRU.

"Non-VRU device": regular V2X device located in a vehicle and adapted to enable low-power V2X device operation as disclosed herein.

BACKGROUND

Adding V2X functionality to a battery-operated device, like a smartphone, will increase significantly the value of V2X communication technologies and accelerate market penetration. A smartphone can be used as a vehicle after-market device, as a two-wheeler (e.g. bicycle) safety device, or even as a pedestrian safety device.

Some wireless standards, like Bluetooth, are designed to operate using a battery in a low-power batter-operated device. Commonly, a low-power wireless standard defines a sleep period, either periodic or per activity, allowing shutting down a receiver. V2X wireless standards, either 802.11p or 3GPP C-V2X Rel. 14/15 (LTE-V2X) or Rel. 16/17 (NR-V2X), allow low-power transmit-only operation. However, the safety benefit of that is limited, since the low-power V2X device user is not warned of safety risks from nearby road users, hence the probability of mitigating a risk of getting hit by a vehicle is decreased, and the user does not feel protected without being warned. It would be advantageous to also allow receive operation, however, the battery life of the battery-operated device cannot be shortened significantly when V2X will be active.

FIG. 1A illustrates a known low-power V2X activity cycle. The standard cellular V2X (C-V2X) allocation is a full reception cycle 100. The receiver is turned on constantly, as a first receiver slot RX0 102 spans between the start of the cycle and a first transmission slot TX1 104. A second receiver slot RX1 106 spans between TX1 slot 104 and a TX2 slot 108. A third receiver slot RX2 110 spans from the end of TX2 slot 108 till the end of the cycle.

FIG. 2A illustrates a known dedicated short-range communications (DSRC) activity. The figure shows a first receive period RX1 206, a first DCF Interframe Space (DIFS) 208, a scan period 210, a single transmission period TX 212, a second DIFS 214, a second receive period RX2 216, and a third DIFS 218. TX 212 is the only transmission period in the cycle. RX2 216 is separated from TX 212 by DIFS 214. In some examples, the separation period during which the receiver is scanning for a newly received message or for a packet waiting to be transmitted can be longer than DIFS.

One disadvantage of the receiver operation in both FIGS. 1A and 2A is that the receiver is active all the time, requiring high power consumption.

There is therefore a need for, and it would be advantageous to have methods and devices that can enable a V2X device to shut down its operation during pre-configured periods to lower power consumption.

SUMMARY

Embodiments disclosed herein refer to scheduling methods and associated devices for vehicle transmission that allow battery-operated V2X devices to reduce activity. Such methods (and associated device components) enhance the functionality of both a low-power V2X device and a "regular" V2X device (the latter being a V2X device that has to include specific adaptations to enable low-power V2X device operation).

In various examples, there is provided a V2X device installed in a warning vehicle, comprising: a modem that includes a receiver configured to receive a message that identifies a VRU as being at risk, and a transmitter configured to transmit a message, after receiving the message from that identifies the VRU as being at risk, only during a short interframe space (SIFS) period in DSRC, or only during a predetermined period in C-V2X communications, whereby the transmission of warning vehicle messages in only certain periods reduces power consumption in a VRU device carried by the VRU.

In some examples, the message transmitted to the VRU includes a VRU signal.

In some examples, the VRU signal has a mapping based on a sidelink synchronization signal (SLSS).

In some examples, a V2X device comprises a risk assessor unit for determining the risk to the VRU.

In some examples in which the communications are C-V2X communications, the VRU is identified as being at risk by a VRU identifier unit in the V2X device based on a MAC address or L2 ID in the received message.

In some examples in which the communications are DSRC, the VRU is identified as being at risk by a VRU identifier unit in the V2X device based on a Source Address (SA) in the received message.

In some examples, the VRU device is included in a battery-operated mobile electronic device. In some examples, the mobile electronic device is a smartphone.

In various examples, there is provided a VRU device capable of performing V2X communications, the VRU device comprising a modem that includes a transmitter and a receiver, wherein the receiver is configured to detect only a message received from a warning vehicle during a SIFS period after transmission by the VRU device in DSRC, or only a message received from the warning vehicle in a defined time period after transmission by the VRU device in C-V2X communications, and wherein the receiver is further configured to be turned off until a next transmission by the VRU device, whereby the receiver configuration reduces power consumption in the VRU device.

In some examples, the message received from the warning vehicle includes a VRU signal. In some examples, the VRU signal has a mapping based on a sidelink synchronization signal (SLSS).

In some examples, a VRU device comprises a low-power message analyzer that uses slow security and processing elements to handle the warning message.

In some examples, a VRU device comprises a power-down management unit for turning off the low-power message analyzer when the low-power message analyzer is not operating.

In some examples, a VRU device comprises VRU device is included in a battery-operated mobile electronic device. In some examples, the battery-operated mobile electronic device is a smartphone.

In various examples, there is provided a method for V2X communications, comprising, by a VRU device capable of performing V2X communications and comprising a transmitter and a receiver, transmitting a message using DSRC or C-V2X communications; configuring the receiver to detect only a message received from a warning vehicle during a SIFS period after the transmission by the VRU device using DSRC, or only a message received from a warning vehicle in a defined time period using C-V2X communications; and turning the receiver off until a next transmission by the VRU device, to reduce power consumption in the VRU device.

In some examples, the configuring the receiver includes configuring the receiver to open for a predetermined period.

In some examples with DSRC, the predetermined period is a DCF Interframe Space (DIFS).

In some examples with V2X communications, the predetermined period is, when a VRU signal is expected, a window of two symbols.

In various examples, there is provided a method for V2X communications, comprising: in a warning vehicle, by a regular V2X device comprising a receiver and a transmitter and adapted to enable low-power V2X device operation, receiving a message from a VRU at risk, and configuring the transmitter to transmit only during a SIFS period in DSRC, or only during a configured period in C-V2X communications to reduce power consumption in a VRU device carried by the VRU at risk.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Figure 1A:
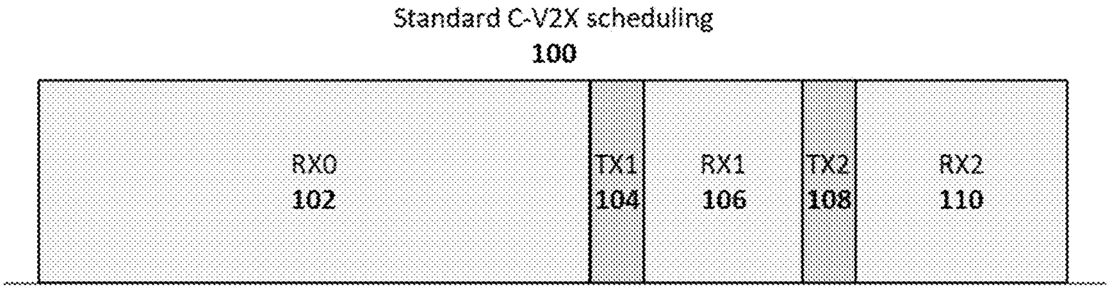
FIG. 1A illustrates a known C-V2X communications activity cycle.
Figure 1B:
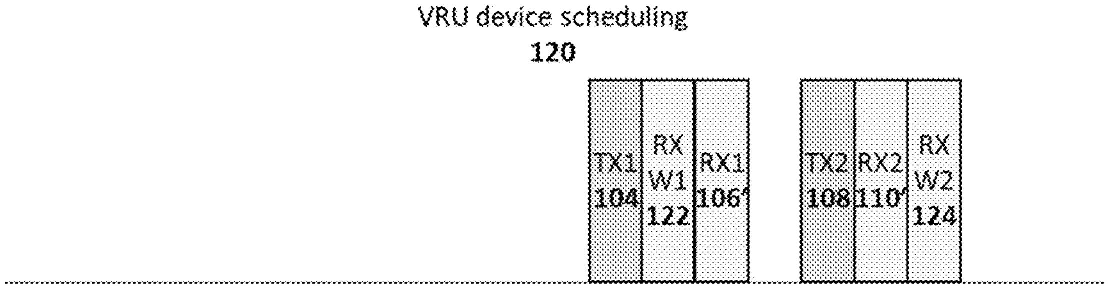
FIG. 1B illustrates a new minimal reception cycle used by a VRU device in a method disclosed herein.

FIG. 1B illustrates a minimal reception cycle 120 used by a low-power C-V2X device carried by or associated with a VRU (referred to as "VRU device") according to some examples of methods disclosed herein. This VRU device transmits twice per cycle, at a first TX1 104 and a second TX2 108. The receiver is turned on only for 2 slots after each transmission. After TX1 104 (also referred to now as "first VRU TX"), a first warning message is received from a warning vehicle in a slot RX W1 122. The reception is kept open for a slot 106', which is a slot at a similar location as RX1 106, except that it ends earlier. Afterwards, the receiver is turned off. After TX2 108, the receiver attempts reception in a slot RX2 110'. In a next slot, the warning vehicle transmits a second warning message which is received in a slot RX W2 124. Afterwards, the receiver is turned off.

Figure 1C:
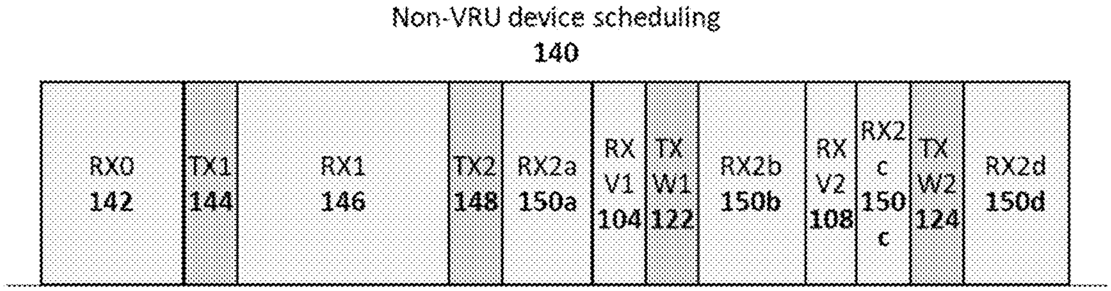
FIG. 1C illustrates a new reception cycle used by a warning vehicle non-VRU device in a method disclosed herein.

FIG. 1C illustrates a new reception cycle used by a non-VRU device of a warning vehicle, i.e. a regular V2X device adapted to enable low-power V2X device operation), according to some examples of methods disclosed herein. The operation till a reception slot RX2a 150*a* follows the same (known) path as in FIG. 1A. A difference is noticed when a first message from a VRU at risk arrives in a slot RX V1 104. Since the VRU is identified as at risk, a first warning message is transmitted in a slot TX W1 122 immediately. Known operation then resumes. When a second message from the VRU is received in a slot RX V2 108, the transmitter selects to transmit a second warning message not immediately but at the following slot, either randomly or based on the existing allocations of those slots. Thus, the second warning message is transmitted in slot TX W2 124.

Figure 2A:
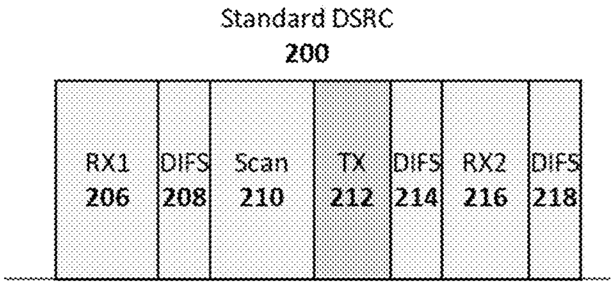
FIG. 2A illustrates a known DSRC activity.
Figure 2B:
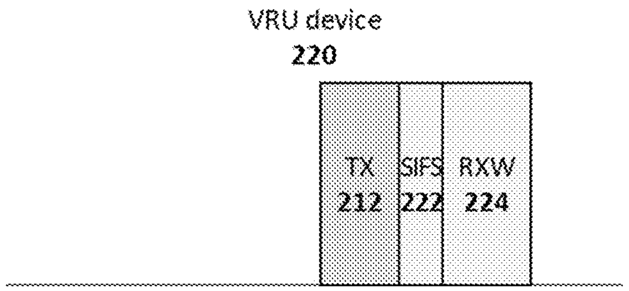
FIG. 2B illustrates a new minimal activity used by a VRU device in DSRC.

FIG. 2B illustrates a new minimal activity operation used by a low-power DSRC device carried by a VRU (also a "VRU device"), according to some examples of methods disclosed herein. First, a transmission by the VRU device occurs in TX 212. Next, a Short Interframe Space (SIFS) period 222 passes. If the VRU is at risk, then a warning message is received in a receive period RXW 224. Afterwards, the receiver is turned off. Had the warning message not been received, the receiver would have been turned off after SIFS 222.

Figure 2C:
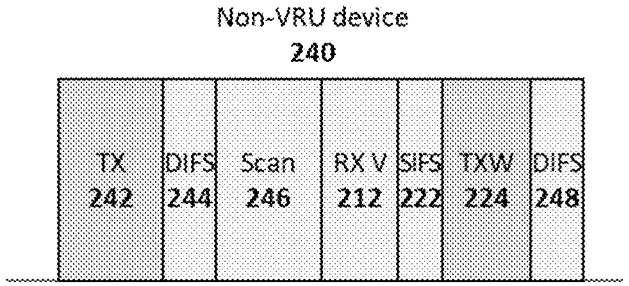
FIG. 2C illustrates a new activity used by a warning vehicle non-VRU in DSRC.

FIG. 2C illustrates a new activity operation used by a warning vehicle DSRC non-VRU device, according to some examples of methods disclosed herein. The operation is as known until a message is received from a VRU at risk in a receive period RX V 212. After waiting a SIFS period 222, the vehicle warns the VRU and transmits in a period TXW 224.

Advantageously, in the use of a method disclosed in examples above or below in C-V2X communications, if a VRU signal is not used, an activity cycle will be 2 msec (two 1 msec slots) out of 100 msec, or 2% of a known, currently used activity cycle. If a VRU signal is used, an activity cycle will be 320 μsec (twice two 80 msec symbols) out of 100 msec, or 0.32% of a known, currently used activity cycle. In the use of a method disclosed in examples above or below in DSRC, the activity cycle is will be 34 μsec (802.11 DIFS time) out of 100 msec, or 0.034% of a known, currently used activity cycle. This dramatic activity reduction will allow use of low-power battery operated V2X receiving devices. The term "low-power" is therefore used herein as a term that reflects lower power requirements (or "lower power consumption") that those of known battery-operated V2X devices.

Embodiments of methods and VRU or non-VRU devices will be now described in more detail.

Figure 3:
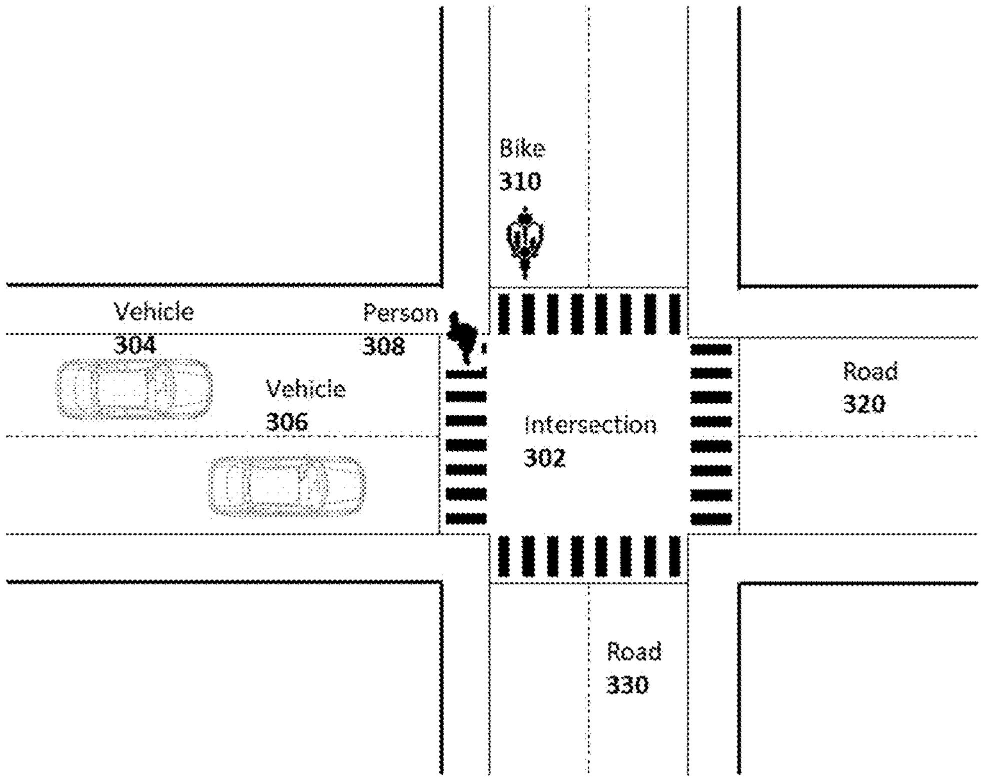
FIG. 3 illustrates an intersection with vehicles and VRUs.

FIG. 3 illustrates an intersection with vehicles and VRUs. The vehicles use non-VRU devices and the VRUs use VRU devices. Intersection 302 connects two crossing roads 320 and 330. A method disclosed herein can be applied in any other shape intersection, e.g. a T-junction or a roundabout, or to any road type or risk. Vehicles 304 and 306 are driving on road 320 toward the intersection. Both are endangering a pedestrian 308 who has a VRU device. Instead of pedestrian 308 receiving all nearby messages, he/she will just listen in a single slot, in which the endangering vehicles 304 and 306 (which are also "warning" vehicles with non-VRU devices) will transmit. A bike 310 with a rider carrying a VRU device is progressing quickly on road 330 into the intersection. Depending on a time-to-collision (TTC) with each specific vehicle, vehicles 304 and 306 will warn the bike rider.

Figure 4:
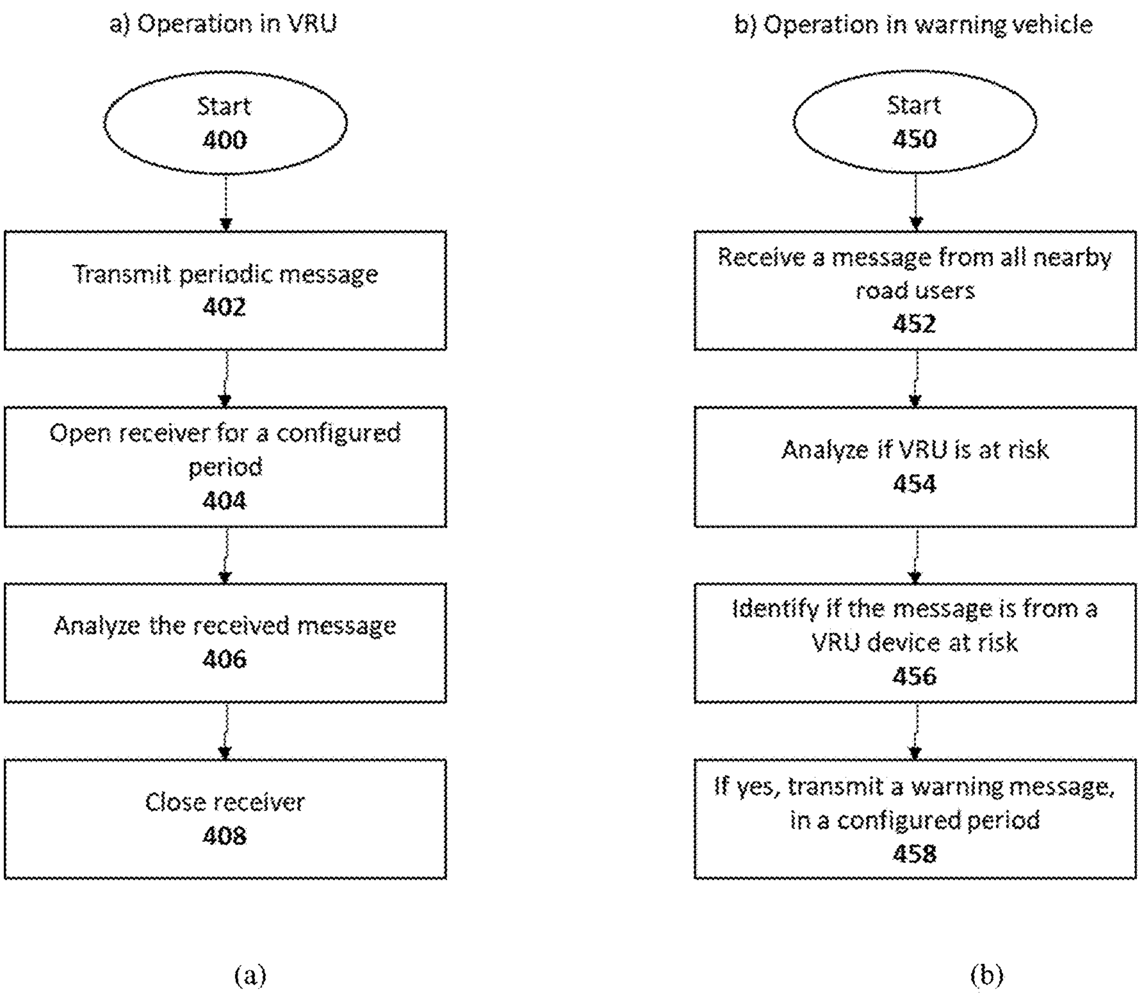
FIG. 4 illustrates in high-level flow charts: (a) a VRU device operation, and (b) a non-VRU device operation.

FIG. 4 illustrates in high-level flow charts: (a) operation in a VRU device, and (b) operation in a non-VRU device in a warning vehicle, according to some examples of methods disclosed herein.

In FIG. 4(*a*), the VRU device operation starts in step 400 every periodic wakeup. The typical period is 100 msec, but it may grow if the VRU device is static or if it moves with constant kinematics. In step 402, a periodic message with location and speed is transmitted by the warning vehicle non-VRU device. In step 404, the receive window is opened for a configured and predetermined period. The opening period depends on the wireless technology in use. In DSRC, the opening period duration is DIFS (34 μsec) and the receiver stays open if a message began reception during that period. In C-V2X communications, when a VRU signal is expected, the window opens for two symbols. Otherwise, the receiver is open for the entire slot, 1 msec in LTE-V2X or 0.5 msec in NR-V2X. In step 406, if a message was received, it is analyzed to determine if a warning should be issued to the VRU about to be hit by the warning vehicle. In step 408, the receiver is closed.

In FIG. 4(*b*), the operation of the non-VRU device starts in step 450. The step is called every slot (0.5 msec in NR-V2X, 1 msec in LTE-V2X), or constantly in DSRC. In step 452, a message is received by the non-VRU device in the warning vehicle from any nearby road user. In step 454, the content of the received message is analyzed to detect a risk to the VRU based on the TTC. In step 456, the received message is checked to see if it originated from a VRU device carried by a VRU identified as a risk by the warning vehicle in a previous check, as detailed in FIG. 6. If Yes in step 458, a warning message is transmitted instantly by the warning vehicle. The slot containing the warning message preferably includes a VRU signal in C-V2X communications, or is transmitted in a special Short Interframe Space (SIFS) period in DSRC. In both cases, the receive operation of the VRU device is confined to a dedicated period to reduce power requirements (consumption). In the first case, the VRU device receives a regular message, and in the second case receives a VRU signal (see below), which requires less power to receive. If No in step 458, nothing is transmitted by the warning vehicle.

Figure 5:
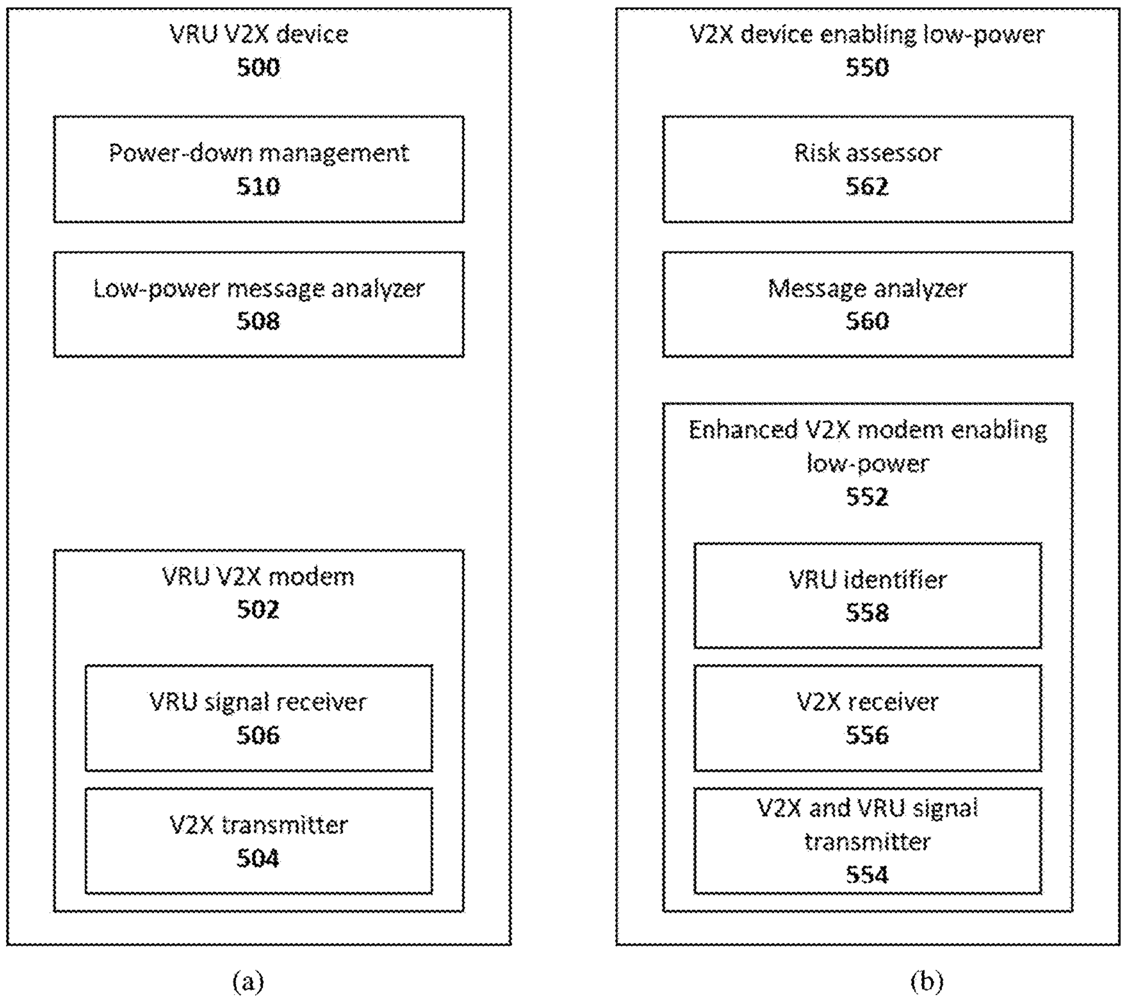
FIG. 5 illustrates using block diagrams: (a) a VRU device utilizing a VRU signal, and (b) a non-VRU device utilizing a VRU signal.
Figure 8:
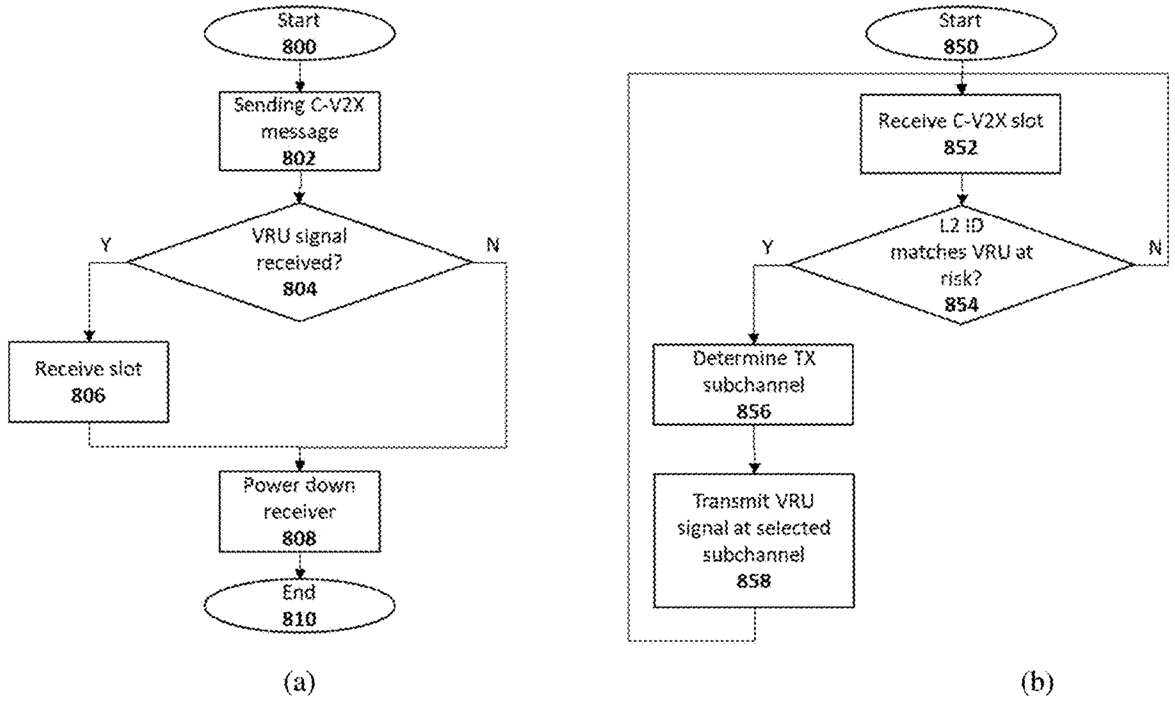
FIG. 8 illustrates timing diagrams of VRU C-V2X transmission in: (a) a VRU device, and (b) a non-VRU device.

FIG. 5 illustrates in block diagrams in (a) and (b) examples of two devices disclosed herein that enable low-power V2X operation using a VRU signal: (a) a VRU device numbered 500 and (b) a regular V2X device enabling low-power (i.e. a non-VRU device) numbered 550. The VRU signal, as defined in FIG. 8, is used for communication from vehicles to VRUs. The use here of the VRU signal is on top of the operation of FIG. 3 which is applicable for both regular and VRU signals. Operation will be very efficient with the VRU signals, and efficient without adding the VRU signals.

VRU device 500 comprises a VRU V2X modem 502 for sending and receiving messages. The modem includes a V2X transmitter 504, and a VRU receiver 506 configured to detect messages received during SIFS in DSRC and messages with a VRU signal in C-V2X communications (and therefore also referred to as "VRU signal receiver"). Since only a single reception is expected, the processing latency can be high, meaning the processing can be slow. Slow processing, with a low clock frequency, consumes less power. In addition, VRU device 500 includes a message analyzer 508, which can use slow security and can process elements of the warning message, and a power-down management unit 510 that turns off receiver 506 immediately once the reception is no longer needed, and turns off message analyzer 508 when it is not operating.

In some examples, all or at least some components of device 500 may be hardware (HW) components.

Non-VRU device 550, which enables low-power operation, comprises an "enhanced" V2X modem 552 that enables low-power, the enhancement being in that modem 552 includes a VRU signal transmitter 554 with controlled timing and added VRU signals that applies a SIFS period in the DSRC case or adds a VRU signal in the C-V2X communications case; a V2X receiver unit 556; and a VRU identifier unit 558 that identifies if the message is received from a VRU device at risk based on the MAC address in the received message. Device 550 further comprises a legacy message analyzer 560 for analyzing the risks of all nearby road users and a risk assessor unit 562 for determining a potential risk to VRUs and other road users.

In some examples, all or at least some components of device 500 may be software (SW) components.

Figure 6:
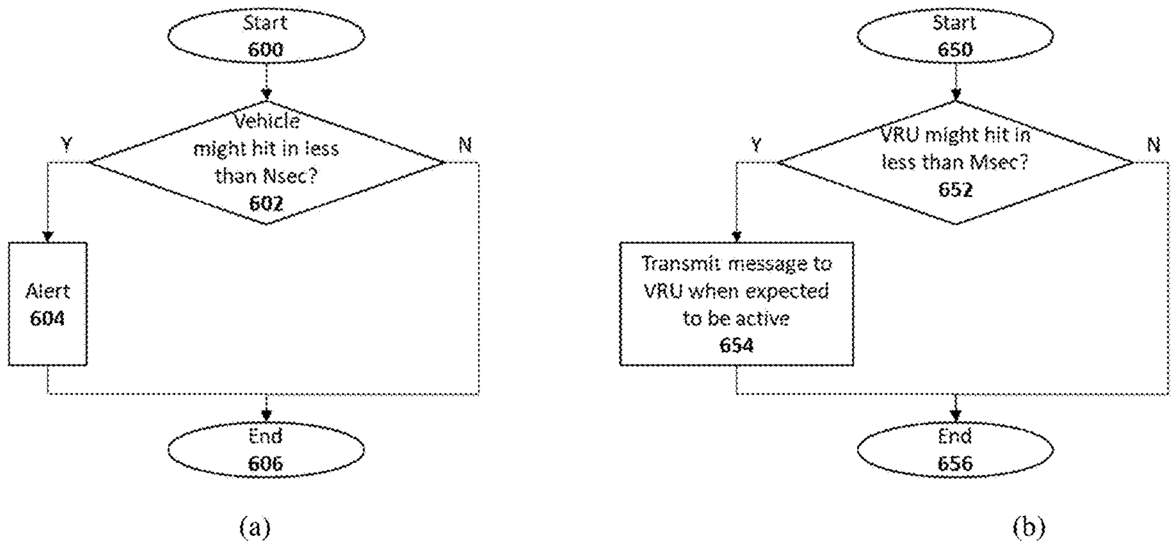
FIG. 6 illustrates using high-level flow charts: (a) operation a VRU device for an alert (or warning), and (b) operation of a non-VRU device for an alert or warning.

FIG. 6 illustrates using high-level flow charts (a) operation a VRU device for an alert (or warning), providing details of step 406, and (b) operation of a non-VRU device for an alert, providing details of step 454. The operation in (a) starts in step 600 whenever a message is received. In step 602, a check is performed if the vehicle may hit the VRU in less than N seconds. Typically, N=3. If yes, the operation continues from step 604, and the VRU is alerted (warned). Next, the operation ends in step 606. If check 602 indicated no risk, the operation ends in step 606.

The non-VRU device enabling low-power operation in (b) starts in step 650 and is performed for each received message. In step 652, a check is performed by risk assessor unit 562 if the vehicle may hit the VRU in less than M seconds. Typically, M=4 sec. Note that M>N since there should be sufficient transmission opportunities to warn the VRU device ahead of time. If yes, the operation continues from step 654, and a message is transmitted to the VRU device when the VRU device is expected to be active, i.e.

right after the VRU device transmits. Next, the operation ends in step 656. If check 652 indicated no risk, the operation ends in step 656.

Figure 7:
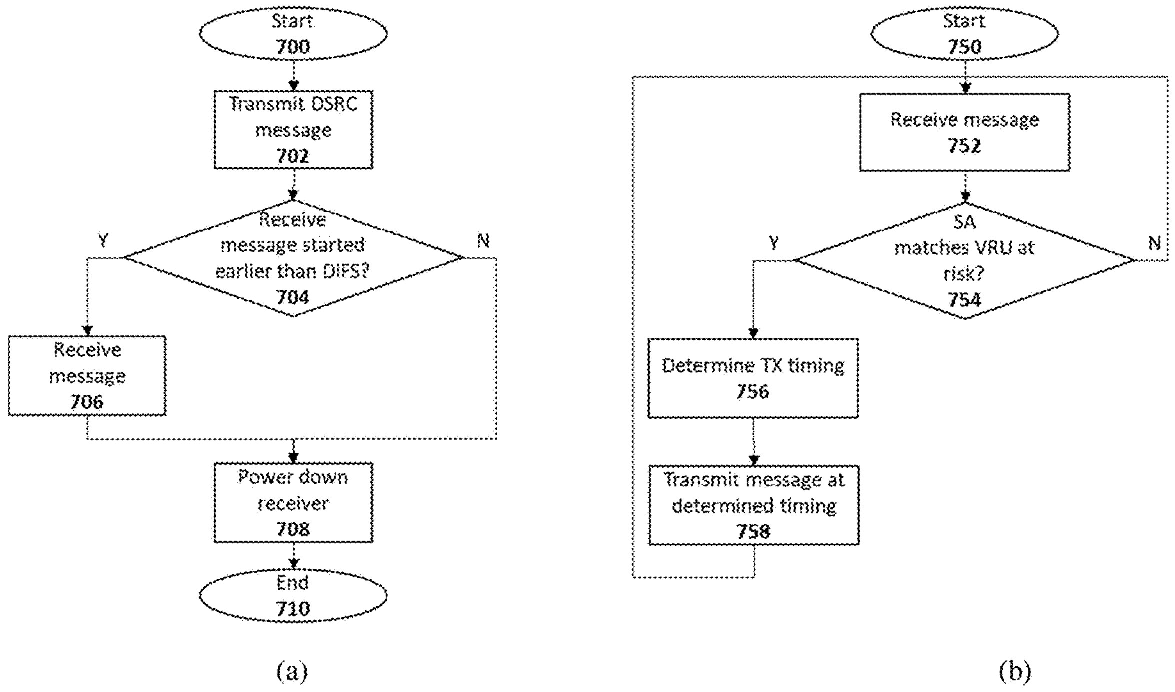
FIG. 7 illustrates timing diagrams of VRU DSRC transmission in: (a) a VRU device, and (b) a non-VRU device.

FIG. 7 illustrates timing diagrams of VRU DSRC transmission in (a) a VRU device, providing details of steps 402 and 404, and (b) a non-VRU device, providing details of steps 452, 456 and 458.

The VRU device operation starts in step 700. In step 702, a DSRC message is transmitted. In step 704, a check is performed if a message started earlier than DIFS (DCF interframe space) from the end of the transmitted message. If not, the receiver is powered down in step 708, and the operation ends in step 710. If yes, the message is received. After the message ends, the operation continues from step 708.

The non-VRU device operation starts in step 750. In step 752, a DSRC message is received. In step 754, the Source Address (SA) in the DSRC message is matched by VRU identifier unit 558 with the VRU device at risk. If a match is not found, the operation returns to step 752. If a match is found, the operation continues to step 756, where TX timing is determined. The challenge is coordinating the timing between multiple vehicles potentially endangering the VRU device. A concurrent transmission will lead to a collision, and the VRU device will not be warned. Two transmission timing setting options are possible, potentially toggling the selected option after each transmission. The first option is purely random. Selecting the transmission start time distributed between SIFS and DIFS. The second option is to set the time as a function of the time-to-collision (TTC), as Transmission time=SIFS+ (TTC-minTTC)*(DIFS-SIFS)/(maxTTC-minTTC), where minTTC is the minimal TTC in which an alert is issued, typically 1.5 seconds, and maxTTC is the maximal TTC in which an alert is issued, typically 4 seconds. In step 758, the message is transmitted at the designated time. The operation returns to step 752.

All VRU devices disclosed herein may be included in (i.e. be part of) a mobile electronic device such as a smartphone (not shown). Alternatively, a smartphone with VRU device capabilities for V2X communications as disclosed herein may also simply be considered to be a VRU device.

FIG. 8 illustrates timing diagrams of VRU C-V2X transmission in: (a) a VRU device, providing details of steps 402 and 404, and (b) a non-VRU device, providing details of steps 452, 456 and 458. The VRU device operation starts in step 700. In step 802, a C-V2X message is transmitted. In step 804, a check is performed if a VRU signal is received after the second symbol in the slot. If not, the receiver is powered down in step 808, and the operation ends in step 810. If yes, the entire slot is received, and the message is parsed. After the message ends, the operation continues from step 808.

The non-VRU device operation in (b) starts in step 850. In step 852, a C-V2X message is received. In step 854, the source address L2 ID is matched by VRU identifier unit 558 with a VRU device of the VRU at risk. Since the decision should be made until the next slot begins, hardware acceleration or dedicated processing is needed for L2 ID decoding in the PCCSH (C-V2X control channel). If a match is not found, the operation returns to step 852. If a match is found, the operation continues to step 856. Every C-V2X transmission requires a specific time and subchannel determined in this step. The challenge is coordinating the selected subchannels between multiple vehicles potentially endangering the VRU device to avoid a collision. The two endangering vehicles are likely to have different measurements of subchannel energy. Therefore, the selection can't rely only on measurement. The suggested scheme combines energy measurement, TTC, and randomization. First, the H subchannels, where H is typically 2, with the highest energy, as long as the energy is higher than Hmin, typically −82 dBm, are excluded from selection. Later, if TTC<N seconds where N is typically 3 sec, then the subchannel is selected randomly from the first half of available subchannels, otherwise, selecting the subchannel randomly from the second half of available subchannels. In step 858, the message is transmitted at the selected subchannel. The operation returns to step 852.

Figure 9:
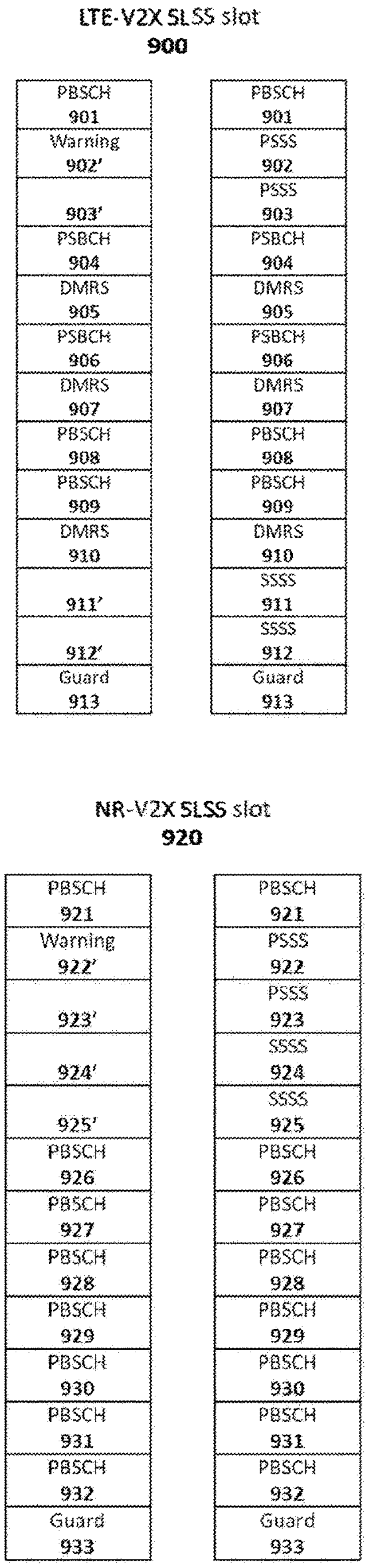
FIG. 9 illustrates an example of C-V2X VRU signal.

FIG. 9 illustrates an example of a C-V2X VRU signal mapping disclosed herein. The VRU signal mapping is based on a sidelink synchronization signal (SLSS), although several other models can be applied. The advantages of the VRU signal mapping based on SLSS include having a time-domain pattern in SSSS and Sidelink Primary Synchronization Signal (PSSS) that can be easily detected using a correlator without the need to transform to the frequency domain and having dedicated subcarriers without interrupting normal traffic. As can be seen, SLSS is composed of PSBCH (Physical Sidelink Broadcast Channel), which appears in symbols 901, 904, 906, 908 and 909 in LTE-V2X SLSS slot, 900, and in 921, 926, 927, 928, 929, 930, 931, 932 in NR-V2X SLSS slot, 920. It includes a PSSS which appears in symbols 902 and 903 in LTE-V2X SLSS slot 900, and in 922 and 923 in NR-V2X SLSS slot 920, and SSSS which appears in symbols 911 and 912 in LTE-V2X SLSS slot 900, and in 924 and 925 in NR-V2X SLSS slot 920.

The example in FIG. 9 replaces the PSSS and SSSS with different unique sequences to indicate the presence of a warning message. Warning pattern appears in symbols 902' in LTE-V2X900, and in 922' in NR-V2X. That enables the receiver to determine after the second symbol if the message contains a warning. Special encoding of the PSBCH field can be utilized as well.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

It should be understood that where the claims or specification refer to "a" or "an" element, such reference is not to be construed as there being only one of that element.

Some stages of the aforementioned methods may also be implemented in a computer program for running on a computer device, at least including code portions for performing steps of a the relevant method when run on a programmable apparatus, such as a computer device or enabling a programmable apparatus to perform functions of a device or device according to the disclosure. Such methods may also be implemented in a computer program for running on a computer device, at least including code portions that make a computer execute the steps of a method according to the disclosure.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:

1. A vehicle-to-everything (V2X) device installed in a warning vehicle, comprising: a modem that includes:
   a receiver configured to receive a message that identifies a vulnerable road user (VRU) as being at risk; and
   a transmitter configured to transmit a message, after receiving the message that identifies the VRU as being at risk, only during a short interframe space (SIFS) period in dedicated short-range communications (DSRC), or only during a predetermined period in cellular V2X (C-V2X) communications, whereby the transmission of warning vehicle messages in only certain periods reduces power consumption in a V2X device associated with the VRU.

2. The V2X device of claim 1, wherein the message transmitted to the VRU includes a VRU signal.

3. The V2X device of claim 2, wherein the VRU signal has a mapping based on a sidelink synchronization signal (SLSS).

4. The V2X device of claim 1, further comprising a risk assessor unit for determining the risk to the VRU.

5. The V2X device of claim 1, wherein the communications are C-V2X communications, and wherein the VRU is identified as being at risk by a VRU identifier unit based on a medium access control (MAC) address or layer two identity (L2 ID) in the received message.

6. The V2X device of claim 1, wherein the communications are DSRC, and wherein the VRU is identified as being at risk by a VRU identifier unit based on a Source Address (SA) in the received message.

7. The V2X device of claim 1, wherein the V2X device associated with the VRU is included in a battery-operated mobile electronic device.

8. The V2X device of claim 7, wherein the battery-operated mobile electronic device is a smartphone.

9. A vulnerable road user (VRU) device capable of performing vehicle-to-everything (V2X) communications, the VRU device comprising:
   a modem that includes a transmitter and a receiver, wherein the receiver is configured to detect:
   a message received from a warning vehicle only during a short interframe space (SIFS) period after transmission by the VRU device in dedicated short-range communications (DSRC), or
   a message received from the warning vehicle only in a defined time period after transmission by the VRU device in cellular V2X (C-V2X) communications,
   wherein the receiver is further configured to be turned off until a next transmission by the VRU device, receiver configuration reducing power consumption in the VRU device.

10. The VRU device of claim 9, wherein the message received from the warning vehicle includes a VRU signal.

11. The VRU device of claim 10, wherein the VRU signal has a mapping based on a sidelink synchronization signal (SLSS).

12. The VRU device of claim 9, further comprising a low-power message analyzer that uses slow security and processing elements to handle the warning message.

13. The VRU device of claim 12, further comprising a power-down management unit for turning off the low-power message analyzer when the low-power message analyzer is not operating.

14. The VRU device of claim 9, wherein the VRU device is included in a battery-operated mobile electronic device.

15. The VRU device of claim 14, wherein the battery-operated mobile electronic device is a smartphone.

16. A method for vehicle-to-everything (V2X) communications, comprising, by a vulnerable road user (VRU) device capable of performing V2X communications and comprising a transmitter and a receiver:
   transmitting a message using dedicated short-range communications (DSRC) or cellular V2X (C-V2X) communications;
   detecting a message received from a warning vehicle only during a short interframe space (SIFS) period after the transmission by the VRU device using DSRC, or a message received from a warning vehicle only in a defined time period using C-V2X communications; and
   turning the receiver off until a next transmission by the VRU device to reduce power consumption in the VRU device.

17. The method of claim 16, wherein the configuring the receiver includes configuring the receiver to open for a predetermined period.

18. The method of claim 17, wherein the V2X communications are DSRC and wherein the predetermined period is a DCF Interframe Space (DIFS).

19. The method of claim 17, wherein the V2X communications are C-V2X communications and wherein the predetermined period is, when a VRU signal is expected, a window of two symbols.

20. A method for vehicle-to-everything (V2X) communications, comprising, in a warning vehicle, by a V2X device comprising a receiver and a transmitter and adapted to enable low-power V2X device operation:
   receiving a message from a vulnerable road user (VRU) at risk; and
   transmitting only during a short interframe space (SIFS) period in dedicated short-range communications (DSRC), or only during a configured period in cellular V2X (C-V2X) communications to reduce power consumption in a VRU device carried by the VRU at risk.

* * * * *